(12) United States Patent
Zha et al.

(10) Patent No.: US 10,110,555 B2
(45) Date of Patent: *Oct. 23, 2018

(54) METHOD, DEVICE, AND SYSTEM FOR QUICKLY INFORMING CGN EXCEPTION

(71) Applicant: Huawei Technologies Co., Ltd., Shenzhen (CN)

(72) Inventors: Min Zha, Shenzhen (CN); Jing Huang, Shenzhen (CN); Zhongjian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,007

(22) Filed: Nov. 29, 2016

(65) Prior Publication Data

US 2017/0085525 A1 Mar. 23, 2017

Related U.S. Application Data

(63) Continuation of application No. 14/610,388, filed on Jan. 30, 2015, now Pat. No. 9,553,805, which is a
(Continued)

(30) Foreign Application Priority Data

Aug. 3, 2012 (CN) .......................... 2012 1 0274452

(51) Int. Cl.
*H04L 12/721* (2013.01)
*H04L 12/18* (2006.01)
(Continued)

(52) U.S. Cl.
CPC .......... *H04L 61/2521* (2013.01); *H04L 12/18* (2013.01); *H04L 45/66* (2013.01);
(Continued)

(58) Field of Classification Search
CPC ..... H04L 61/2521; H04L 12/18; H04L 45/74; H04L 45/66
See application file for complete search history.

(56) References Cited

U.S. PATENT DOCUMENTS

| | | | | |
|---|---|---|---|---|
| 5,224,095 A | * | 6/1993 | Woest | H04L 29/06 370/401 |
| 7,054,304 B2 | * | 5/2006 | Wang | H04L 12/185 370/352 |

(Continued)

FOREIGN PATENT DOCUMENTS

| | | |
|---|---|---|
| CN | 101193130 A | 6/2008 |
| CN | 101600194 A | 12/2009 |

(Continued)

OTHER PUBLICATIONS

Wu et al., "MAN NAT444 deployment analysis," China Telecom. Corporation Limited, pp. 35-37, China Academic Journal Electronic Publishing House, Beijing China (2011).
(Continued)

*Primary Examiner* — Rasheed Gidado
(74) *Attorney, Agent, or Firm* — Leydig, Voit & Mayer, Ltd.

(57) ABSTRACT

A method applicable to a commonest application scenario, the method includes: an AR receives a first packet sent in a unicast manner by a CGN. The first packet includes information for indicating Restart announce, the first packet's source address is the CGN's address, and the first packet's destination address is the AR's address; AR changes the first packet's destination address to an address of a CPE connected to the AR, to obtain a second packet, where the AR and the CPE are connected by using a Layer 2 network, and the CPE's address is a multicast address; and the AR sends the second packet. The method is used for quickly informing, after the CGN restarts or undergoes an active/standby
(Continued)

switchover, the CPE that an exception occurs, for example, the CGN restarts or undergoes an active/standby switchover, so that a CGN has relatively small load when recreating NAT mapping.

19 Claims, 6 Drawing Sheets

Related U.S. Application Data continuation of application No. PCT/CN2013/079373, filed on Jul. 15, 2013.

(51) Int. Cl.
*H04L 29/12* (2006.01)
*H04L 12/741* (2013.01)

(52) U.S. Cl.
CPC .......... *H04L 45/74* (2013.01); *H04L 61/2514* (2013.01); *H04L 61/2525* (2013.01)

(56) References Cited

U.S. PATENT DOCUMENTS

| 7,606,191 | B1 | 10/2009 | Breau et al. |
| 7,630,364 | B2* | 12/2009 | Stewart ............. H04L 29/12462 370/389 |
| 7,684,397 | B2 | 3/2010 | Kim et al. |
| 7,839,855 | B2 | 11/2010 | Voit et al. |
| 8,223,780 | B2 | 7/2012 | Jiang |
| 8,774,038 | B2 | 7/2014 | Sarikaya et al. |
| 9,258,277 | B1 | 2/2016 | Zhuang et al. |
| 9,374,267 | B2* | 6/2016 | Poirier ................ H04L 61/2528 |
| 2001/0034831 | A1 | 10/2001 | Brutoloni et al. |
| 2005/0089050 | A1 | 4/2005 | Cheriton |
| 2005/0122921 | A1* | 6/2005 | Seo ....................... H04W 48/16 370/310 |
| 2005/0198097 | A1 | 9/2005 | Kalnitsky |
| 2006/0126613 | A1 | 6/2006 | Zweig et al. |
| 2008/0151875 | A1 | 6/2008 | Lim et al. |
| 2011/0182227 | A1 | 7/2011 | Rune et al. |
| 2013/0036416 | A1* | 2/2013 | Raju ................... G06F 9/45558 718/1 |
| 2013/0142167 | A1 | 6/2013 | Shahrier et al. |
| 2013/0227170 | A1 | 8/2013 | Zha et al. |
| 2013/0294461 | A1* | 11/2013 | Zhou .................. H04L 61/2532 370/475 |

FOREIGN PATENT DOCUMENTS

| CN | 101888389 A | 11/2010 |
| CN | 102413196 A | 4/2012 |
| EP | 1331756 A2 | 7/2003 |
| WO | WO 2012056010 A1 | 5/2012 |

OTHER PUBLICATIONS

Wing et al., "Port Control Protocol (PCP) draft-ietf-pcp-base-26," PCP Working Group, Internet-Draft, pp. 1-100, Internet Society, Reston, Virginia (Jun. 5, 2012).

\* cited by examiner

METHOD, DEVICE, AND SYSTEM FOR QUICKLY INFORMING CGN EXCEPTION

CROSS-REFERENCE TO RELATED APPLICATION

This application is a continuation of U.S. patent application Ser. No. 14/610,388, filed on Jan. 30, 2015, which is a continuation of International Application No. PCT/CN2013/079373, filed on Jul. 15, 2013. The International Application claims priority to Chinese Patent Application No. 201210274452.X, filed on Aug. 3, 2012. All of the aforementioned patent applications are hereby incorporated by reference in their entireties.

TECHNICAL FIELD

The present application relates to the field of network communications, and in particular, to a method, device, and system for quickly informing a CGN exception.

BACKGROUND

Currently, IPv4 addresses are getting exhausted, and the problem of IP address shortage is very serious. At present, the problem of IP address shortage is temporarily alleviated by deploying a Carrier Grade NAT (CGN) device in an operator network. A function of Network Address Translation (NAT) is to: when a PC in an internal private network needs to get connected to an external public network, translate an internal address used by the PC in the internal private network into a valid address in the external public network, to ensure normal use of the PC in the external public network. Because multiple PCs in the internal private network can share one valid address in the external public network, the problem of IP address shortage is alleviated to some extent.

Because the CGN plays a crucial role, during actual use, dual-host standby is required, or quick recovery can be implemented after the CGN restarts. However, the CGN stores a large number of dynamic NAT entries; and it is often very difficult to back up these entries in real time, and if the CGN restarts, it is also very difficult to quickly recover these entries. As a result, a connection between a PC user in the internal private network and the external public network has to be re-established.

An IETF (Internet Engineering Task Force) PCP (Port Control Protocol) working group can establish, by using the PCP protocol, the connection between the PC user in the internal private network and the external public network after the CGN restarts or undergoes an active/standby switchover. However, a precondition for implementing the recovery is that a CPE (Customer Premise Equipment) connected to the PC in the internal private network can quickly sense that the CGN device restarts or undergoes an active/standby switchover. That the CGN restarts or undergoes an active/standby switchover is usually referred to as a CGN exception, which, however, is not limited thereto.

Referring to FIG. 1, currently, a specific method of solution 1 includes: when a PCP server (Port Control Protocol server), that is, a CGN, is in an abnormal condition, sending, by using a unicast message, information for indicating Restart announce to each PCP client (Port Control Protocol client), that is, a CPE; and when receiving the information for indicating Restart announce, sending, by the PCP client, NAT mapping information to the PCP server by using the PCP protocol.

However, for the method of solution 1, the PCP server needs to recover, in an abnormal condition, all PCP client information that exists before the abnormal condition of the PCP server occurs. Because a quantity of the information is huge, correspondingly, it needs to take a relatively long time to recover the information. In addition, the PCP server needs to send a message to each PCP client after the PCP server restarts or undergoes an active/standby switchover, which also increases load of the PCP server.

Referring to FIG. 2, a specific method of solution 2 includes: when a PCP server is in an abnormal condition, sending a Restart announce message to each PCP client in a multicast manner.

However, the method of solution 2 is only applicable to a case in which a network between the PCP server and the PCP client is a Layer 2 network, and consequently has a small application scope and is inapplicable to a commonest application scenario at present.

SUMMARY

Embodiments of the present application provide a method, device, and system for quickly informing a CGN exception, so that load of a CGN is relatively small. In addition, the method is applicable to a commonest application scenario.

To achieve the foregoing objective, the embodiments of the present application adopt the following technical solutions:

According to a first aspect, a method for quickly informing a CGN exception is provided, where the method includes:

receiving, by an access router AR (Access Router), a first packet sent in a unicast manner by a carrier grade network address translation (CGN) device, where the first packet includes information for indicating Restart announce, a source address of the first packet is an address of the CGN, and a destination address of the first packet is an address of the AR;

changing, by the AR, the destination address of the first packet to an address of a CPE connected to the AR, to obtain a second packet, where the AR and the CPE are connected by using a Layer 2 network, and the address of the CPE is a multicast address; and sending, by the AR, the second packet.

In a first possible implementation manner of the first aspect, the changing, by the AR, the destination address of the first packet to an address of the CPE, to obtain a second packet specifically includes: changing the source address of the first packet to the address of the AR, and changing the destination address of the first packet to the address of the CPE, to obtain the second packet.

With reference to the first possible implementation manner of the first aspect, in a second possible implementation manner of the first aspect, the method further includes: adding a CGN address option to the second packet to carry the address of the CGN.

Based on the second possible implementation manner of the first aspect, the CGN address option includes:

an option code, a reserved field, a length of the address of the CGN, and the address of the CGN, where the option code indicates a type of the information for indicating Restart announce.

In the first aspect and all the foregoing possible implementation manners of the first aspect, if the CPE belongs to an IPv4 network, the multicast address is 224.0.0.1; if the CPE belongs to an IPv6 network, the multicast address is ff02::1.

According to a second aspect, an access router AR is provided, where the AR includes:

a receiving unit, configured to receive a first packet sent in a unicast manner by a carrier grade network address translation (CGN) device, where the first packet includes information for indicating Restart announce, a source address of the first packet is an address of the CGN, and a destination address of the first packet is an address of the AR;

a generating unit, configured to change, according to the first packet received by the receiving unit, the destination address of the first packet to an address of a CPE connected to the AR, to obtain a second packet, where the AR and the CPE are connected by using a Layer 2 network, and the address of the CPE is a multicast address; and a sending unit, configured to send the second packet generated by the generating unit.

In a first possible implementation manner of the second aspect, the generating unit is specifically configured to: according to the first packet received by the receiving unit, change the source address of the first packet to the address of the AR, and change the destination address of the first packet to the address of the CPE, to obtain the second packet.

With reference to the first possible implementation manner of the second aspect, in a second possible implementation manner of the second aspect, the generating unit is configured to add a CGN address option to the second packet to carry the address of the CGN.

According to a third aspect, a system for quickly informing a CGN exception is provided, where the system includes:

a carrier grade network address translation (CGN) device, a customer premise equipment (CPE), and the foregoing access router AR.

The embodiments of the present application provide a method, device, and system for quickly informing a CGN exception. A CGN sends, to an AR in a unicast manner, a first packet including information for indicating Restart announce. Because there are a limited number of ARs and the ARs are static, the CGN has relatively small load when sending the first packet to the AR; the AR can quickly send, to a CPE in a multicast manner, a second packet including the information for indicating Restart announce. In addition, it is only required in the method that a Layer 2 network is between the AR and the CPE. Therefore, the method is applicable to a commonest application scenario.

BRIEF DESCRIPTION OF DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

Figure 1:
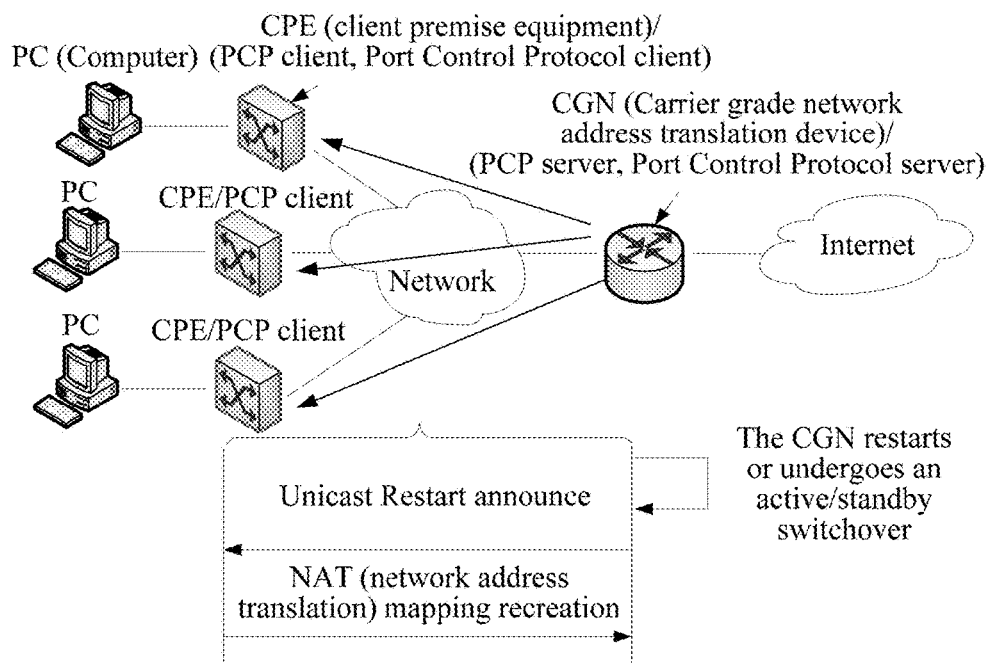
FIG. 1 is a schematic diagram of a scenario in which a CGN exception is quickly informed in the prior art.
Figure 2:
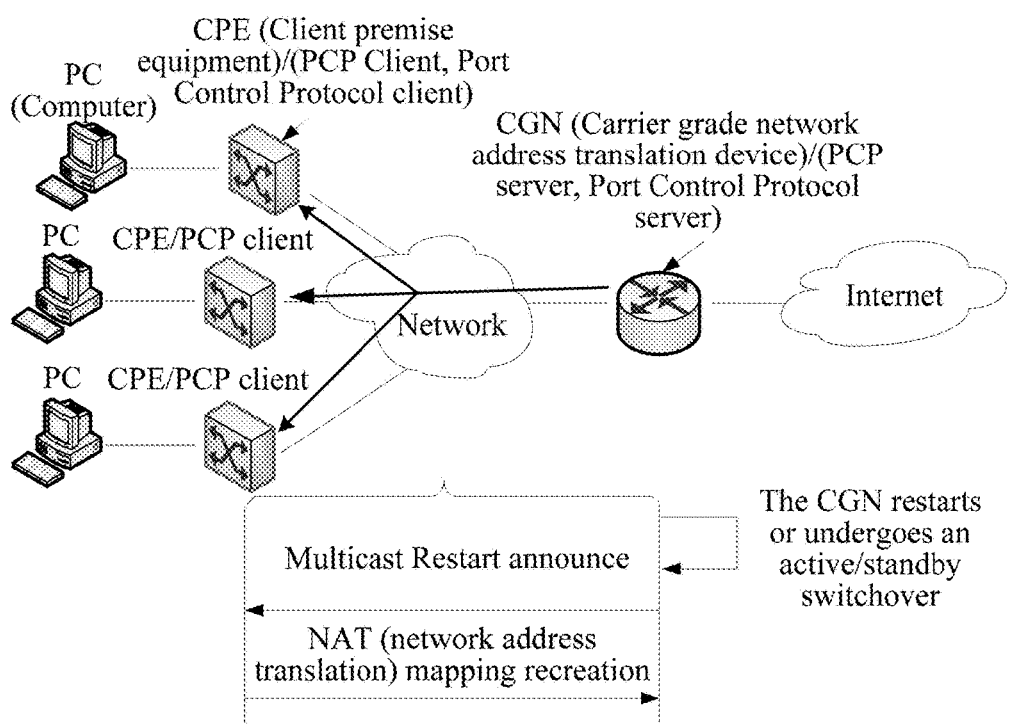
FIG. 2 is a schematic diagram of another scenario in which a CGN exception is quickly informed in the prior art.
Figure 3:
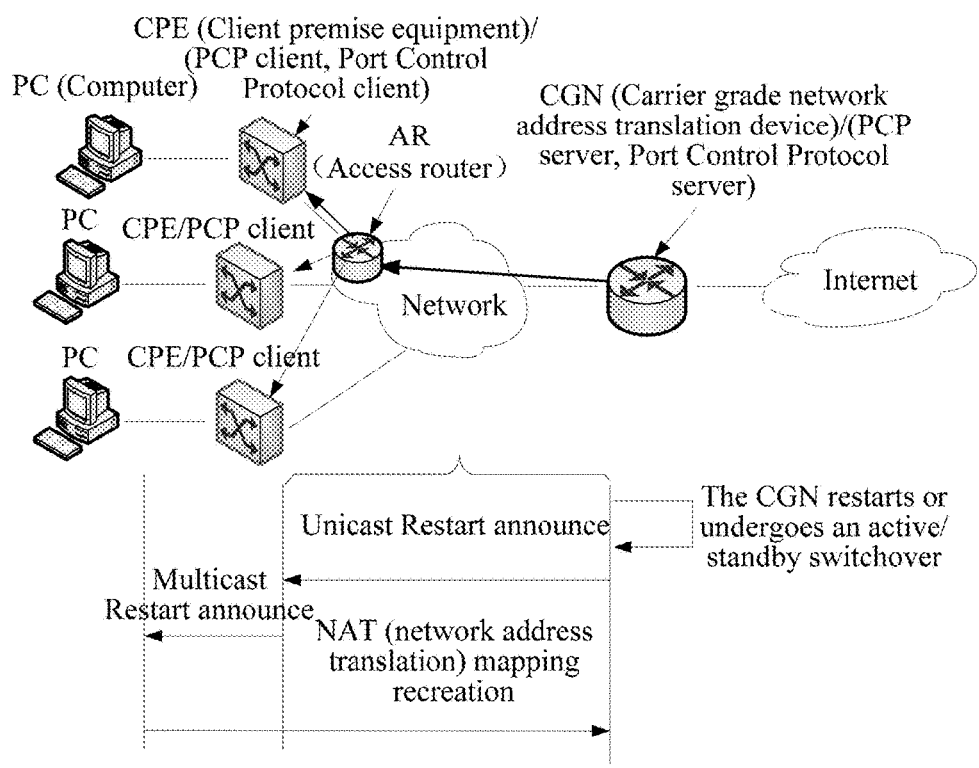
FIG. 3 is a schematic diagram of a scenario in which a CGN exception is quickly informed according to an embodiment of the present application.

An embodiment of the present application provides a method for quickly informing a CGN exception. Referring to FIG. 3, a CGN sends, to an AR in a unicast manner, a first packet including information for indicating Restart announce, and the AR generates a second packet according to the first packet and sends the second packet in a multicast manner.

Figure 4:
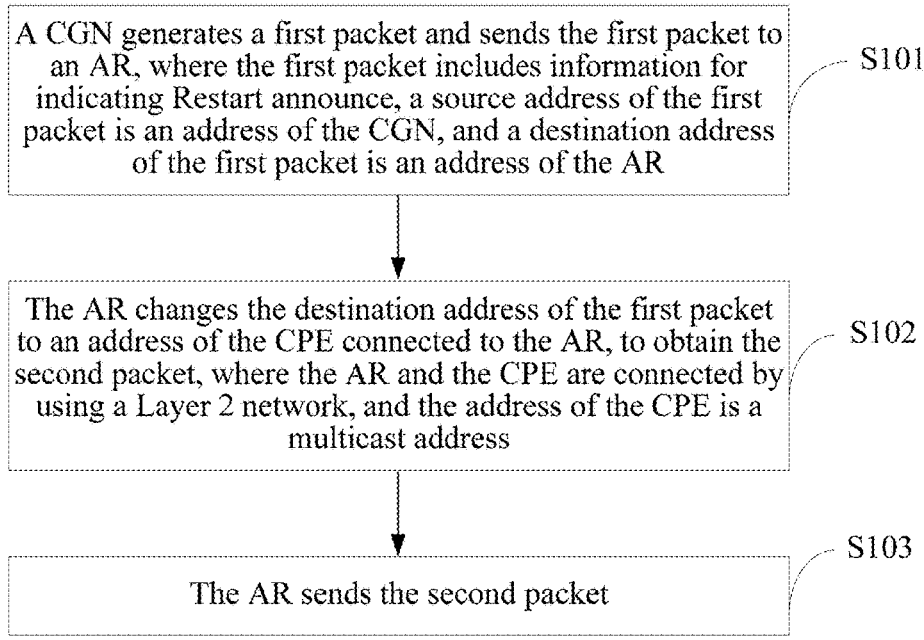
FIG. 4 is a schematic block flowchart of a method for quickly informing a CGN exception according to an embodiment of the present application.

As shown in FIG. 4, the method includes the following steps:

S101: A CGN generates a first packet and sends the first packet to an AR, where the first packet includes information for indicating Restart announce, a source address of the first packet is an address of the CGN, and a destination address of the first packet is an address of the AR.

It should be noted that, preferably, ARs in all the embodiments of the present application all refer to routers closest to a CPE. In all the embodiments of the present application, for description, it is used as an example that the information for indicating Restart announce indicates that the CGN restarts or undergoes an active/standby switchover, but the present application is not limited thereto, and any exception may occur in the CGN.

Exemplarily, the AR may be a Broadband Remote Access Server (BRAS).

Optionally, when an exception occurs, for example, the CGN restarts or undergoes an active/standby switchover, the source address of the first packet generated by the CGN is an IP address of the CGN, and the destination address of the first packet is an IP address of the AR. Further, the first packet may further include: a port number of a port through which the AR receives the first packet.

In the first packet, the IP address of the CGN, the IP address of the AR, and the port number of the port through which the AR receives the first packet are all encapsulated into a packet header of the first packet.

Exemplarily, when the CGN restarts or undergoes an active/standby switchover, the first packet generated by the CGN may be a UDP packet. The information for indicating Restart announce may be encapsulated into the UDP packet, and a packet header of the UDP packet is encapsulated with the IP address of the CGN, the IP address of the AR, and the port number of the port through which the AR receives the first packet.

It should be noted that the first packet is generated only after an abnormal condition occurs, for example, the CGN restarts or undergoes an active/standby switchover. The foregoing AR is all AR(s) saved in an AR list of the CGN before an exception occurs, for example, the CGN restarts or undergoes an active/standby switchover. Therefore, there is at least one AR in all the embodiments of the present application. Because the AR list is static and the number of ARs in the AR list is relatively small, the CGN can quickly recover the saved AR list after the CGN recovers.

When there are multiple ARs, correspondingly, the CGN generates multiple first packets and sends the first packet to each AR in a unicast manner, that is, the CGN sends, to each AR in the unicast manner, the first packet including the information for indicating Restart announce. For each AR, the first packet received by the AR is different only in that an IP address of a destination AR of the first packet is different. In other words, a destination address in the first packet received by each AR is an IP address of the AR.

It should be noted herein that in all the embodiments of the present application, a solution is described only from the perspective of one AR, and the one AR herein may be any one of all the ARs in the AR list of the CGN. Therefore, no matter which AR receives a packet that is sent by the CGN and includes the information for indicating Restart announce, the packet is all referred to as a first packet in all the embodiments of the present application.

S102: The AR changes the destination address of the first packet to an address of a CPE connected to the AR, to obtain a second packet, where the AR and the CPE are connected by using a Layer 2 network, and the address of the CPE is a multicast address.

In addition, when the port number of the port through which the AR receives the first packet, which is included in the first packet, and a port number for indicating a port through which the CPE receives the second packet are different, the AR changes the port number of the port through which the AR receives the first packet to the port number for indicating the port through which the CPE receives the second packet; if the port number of the port through which the AR receives the first packet and the port number for indicating the port through which the CPE receives the second packet are the same, the AR does not need to change the port number of the port through which the AR receives the first packet.

Further, the AR may further change the source address of the first packet to the address of the AR.

In all the following embodiments, the AR may determine the address of the CPE according to a network to which the CPE belongs, that is, the AR may determine a multicast address.

Specifically, if the CPE belongs to an IPv4 network, the multicast address is 224.0.0.1; if the CPE belongs to an IPv6 network, the multicast address is ff02::1.

Exemplarily, a process of generating the second packet according to the first packet may be that: if the AR receives a UDP packet sent by the CGN, and the packet includes the information for indicating Restart announce, the AR changes, according to a network (an IPv4 network or an IPv6 network) to which the CPE belongs, a destination address in a packet header of the UDP packet to a multicast address corresponding to the network to which the CPE belongs. That is, if the CPE belongs to an IPv4 network, the multicast address is 224.0.0.1; if the CPE belongs to an IPv6 network, the multicast address is ff02::1.

In addition, when the port number of the port through which the AR receives the first packet, which is included in the packet header of the UDP packet, and the port number for indicating the port through which the CPE receives the second packet are different, the AR changes the port number of the port through which the AR receives the first packet to the port number for indicating the port through which the CPE receives the second packet; if the port number of the port through which the AR receives the first packet and the port number for indicating the port through which the CPE receives the second packet are the same, the AR does not need to change the port number of the port through which the AR receives the first packet.

The AR further changes a source address in the packet header of the UDP packet to the IP address of the AR.

Further, the AR adds a CGN address option to the second packet to carry the address of the CGN.

The CGN address option includes: an option code, a reserved field, a length of the address of the CGN, and the address of the CGN, where the option code indicates a type of the information for indicating Restart announce.

Figure 5:
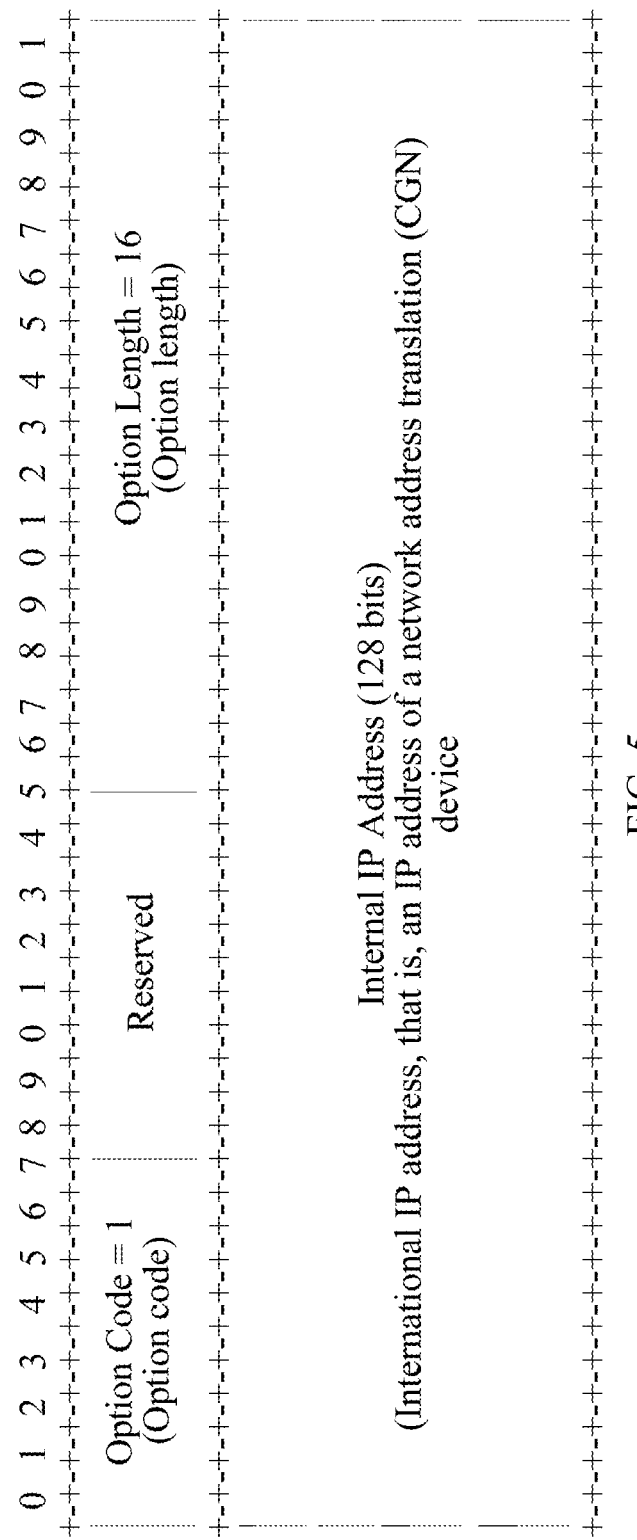
FIG. 5 is a schematic diagram of an option format according to an embodiment of the present application.

As shown in FIG. 5, a format of the option encapsulated into the second packet may be as follows:

A first byte indicates the option code, a second byte indicates the reserved field, a third byte and a fourth byte indicate the length of the address of the CGN, the fifth byte to a twentieth byte indicate the address of the CGN, that is, the IP address of the CGN. The IP address of the CGN is an IPv4 address or an IPv6 address, and when the IP address of the CGN is an IPv4 address, the IP address of the CGN is indicated in a form of an IPv4-mapped IPv6 address.

The option may be a THIRD_PARTY for announce (third-party for announce) option.

Exemplarily, the AR further adds the THIRD_PARTY for announce option to the second packet to carry the address of the CGN, that is, the AR encapsulates the source address (the address of the CGN) of the first packet into the THIRD_PARTY for announce option of the second packet.

The THIRD_PARTY for announce option is encapsulated into the second packet. Referring to FIG. 5, the first byte may be 1, which is used to indicate a type of the information for indicating Restart announce; the second byte indicates the reserved field; the third byte and the fourth byte may be 16 and are used to indicate the length of the IP address of the CGN, that is, 16×8=128 bits; and the fifth byte to the twentieth byte indicate the IP address of the CGN.

It should be noted that the foregoing exemplary process is not limited in a time sequence, and is subject to an actual application process.

S103: The AR sends the second packet.

The AR sends the second packet to the CPE according to a destination address in a packet header of the second packet.

Optionally, after receiving the second packet, the CPE sends NAT mapping information saved by the CPE to the CGN according to the IP address of the CGN in the packet header of the second packet, to request the CGN to create the NAT mapping information.

Optionally, after receiving the second packet, the CPE sends NAT mapping information saved by the CPE to the CGN according to the IP address of the CGN in the THIRD_PARTY for announce option of the second packet, to request the CGN to create the NAT mapping information.

This embodiment of the present application provides a method for quickly informing a CGN exception. A CGN sends, to an AR in a unicast manner, a first packet including information for indicating Restart announce. Because there are a limited number of ARs and the ARs are static, the CGN has relatively small load when sending the first packet to the AR. The AR can quickly send, to a CPE in a multicast manner, a second packet including the information for indicating Restart announce. In addition, it is only required in the method that a Layer 2 network is between the AR and the CPE. Therefore, the method is applicable to a commonest application scenario.

Figure 6:
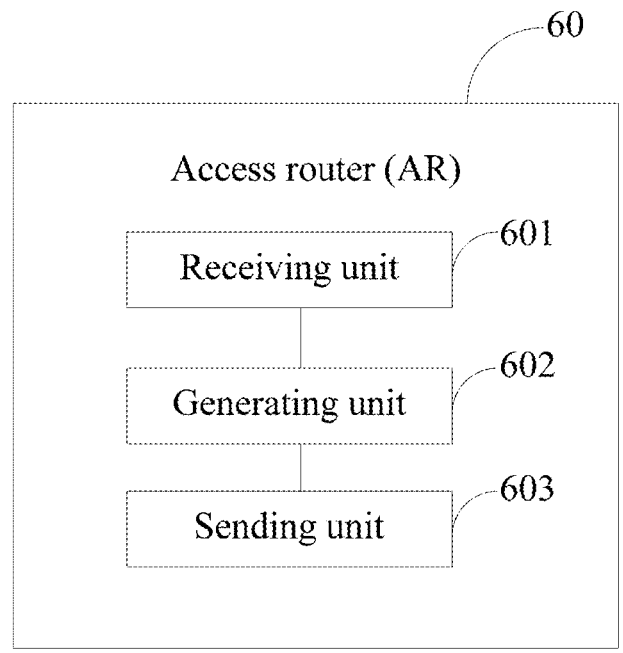
FIG. 6 is a schematic structural block diagram of an AR according to an embodiment of the present application.

An embodiment of the present application provides an AR 60, which is applicable to the foregoing method embodiment and can perform all the actions of the AR in the foregoing embodiment. As shown in FIG. 6, the AR 60 includes: a receiving unit 601, a generating unit 602, and a sending unit 603.

The receiving unit 601 is configured to receive a first packet sent in a unicast manner by a CGN, where the first packet includes information for indicating Restart announce, a source address of the first packet is an address of the CGN, and a destination address of the first packet is an address of the AR.

Optionally, when an exception occurs, for example, the CGN restarts or undergoes an active/standby switchover, the source address of the first packet generated by the CGN is an IP address of the CGN, and the destination address of the first packet is an IP address of the AR. Further, the first packet may further include: a port number of a port through which the AR receives the first packet.

Exemplarily, when an exception occurs, for example, the CGN restarts or undergoes an active/standby switchover, the first packet generated by the CGN may be a UDP packet. The information for indicating Restart announce may be encapsulated into the UDP packet, and a packet header of the UDP packet is encapsulated with the IP address of the CGN, the IP address of the AR, and the port number of the port through which the AR receives the first packet.

The generating unit 602 is configured to change, according to the first packet received by the receiving unit 601, the destination address of the first packet to an address of a CPE connected to the AR, to obtain a second packet, where the AR and the CPE are connected by using a Layer 2 network, and the address of the CPE is a multicast address.

The AR may determine the address of the CPE according to a network to which the CPE belongs, that is, the AR may determine the multicast address.

Specifically, if the CPE belongs to an IPv4 network, the multicast address is 224.0.0.1; if the CPE belongs to an IPv6 network, the multicast address is ff02::1.

Exemplarily, a process of generating the second packet according to the first packet may be that: if the AR receives a UDP packet sent by the CGN, and the packet includes the information for indicating Restart announce, the AR changes, according to a network (an IPv4 network or an IPv6 network) to which the CPE belongs, a destination address in a packet header of the UDP packet to a multicast address corresponding to the network to which the CPE belongs. That is, if the CPE belongs to an IPv4 network, the multicast address is 224.0.0.1; if the CPE belongs to an IPv6 network, the multicast address is ff02::1.

In addition, when the port number of the port through which the AR receives the first packet, which is included in the first packet, and a port number for indicating a port through which the CPE receives the second packet are different, the generating unit 602 changes the port number of the port through which the AR receives the first packet to the port number for indicating the port through which the CPE receives the second packet; if the port number of the port through which the AR receives the first packet and the port number for indicating the port through which the CPE receives the second packet are the same, the generating unit 602 does not need to change the port number of the port through which the AR receives the first packet.

The generating unit 602 may be specifically configured to: according to the first packet received by the receiving unit 601, change the source address of the first packet to the address of the AR, and change the destination address of the first packet to the address of the CPE, to obtain the second packet.

Exemplarily, if the receiving unit 601 receives a UDP packet sent by the CGN, and the packet includes the information for indicating Restart announce, the generating unit 602 changes, according to a network (an IPv4 network or an IPv6 network) to which the CPE belongs, a destination address in a packet header of the UDP packet to a multicast address corresponding to the network to which the CPE belongs. That is, if the CPE belongs to an IPv4 network, a destination address of the second packet is a multicast address 224.0.0.1; if the CPE belongs to an IPv6 network, a destination address of the second packet is a multicast address ff02::1.

In addition, when the port number of the port through which the AR receives the first packet, which is included in the packet header of the UDP packet, and the port number for indicating the port through which the CPE receives the second packet are different, the generating unit 602 changes the port number of the port through which the AR receives the first packet to the port number for indicating the port through which the CPE receives the second packet; if the port number of the port through which the AR receives the first packet and the port number for indicating the port through which the CPE receives the second packet are the same, the generating unit 602 does not need to change the port number of the port through which the AR receives the first packet.

The generating unit 602 further changes a source address in the packet header of the UDP packet to the IP address of the AR.

Further, the generating unit 602 is configured to add a CGN address option to the second packet to carry the address of the CGN.

The option may be a THIRD_PARTY for announce option.

The THIRD_PARTY for announce option includes: an option code, a reserved field, a length of the address of the CGN, and the address of the CGN, where the option code indicates a type of the information for indicating Restart announce. Refer to the method embodiment for a format of the option encapsulated into the second packet, and details are not described herein again.

The sending unit 603 is configured to send the second packet generated by the generating unit 602.

Exemplarily, the sending unit 603 is configured to send the second packet generated by the generating unit 602 to the CPE according to a multicast address in a packet header of the second packet.

Further, optionally, after receiving the second packet, the CPE sends NAT mapping information saved by the CPE to the CGN according to the IP address of the CGN in the packet header of the second packet, to request the CGN to create the NAT mapping information.

Optionally, after receiving the second packet, the CPE sends NAT mapping information saved by the CPE to the CGN according to the IP address of the CGN in the THIRD_PARTY for announce option of the second packet, to request the CGN to create the NAT mapping information.

This embodiment of the present application provides an AR. A CGN sends, to an AR in a unicast manner, a first packet including information for indicating Restart announce. Because there are a limited number of ARs and the ARs are static, the CGN has relatively small load when sending the first packet to the AR. The AR can quickly send, to a CPE in a multicast manner, a second packet including the information for indicating Restart announce. In addition, it is only required in the method that a Layer 2 network is between the AR and the CPE. Therefore, the method is applicable to a commonest application scenario.

Figure 7:
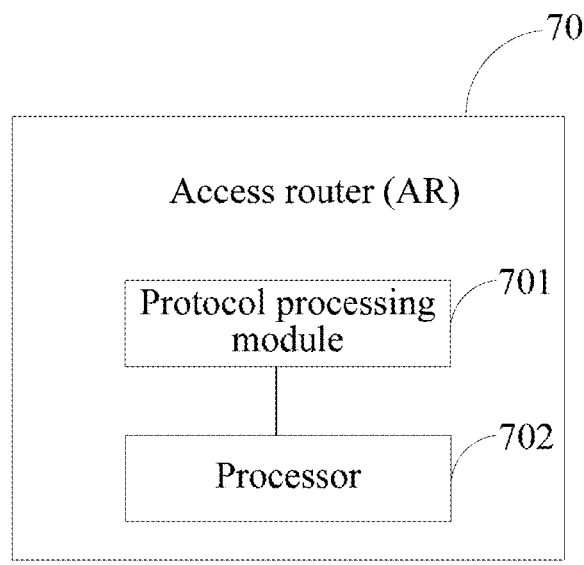
FIG. 7 is another schematic structural block diagram of an AR according to an embodiment of the present application.

An embodiment of the present application provides an AR 70, which is applicable to the foregoing method embodiment and can perform all the actions of the AR in the foregoing embodiment. As shown in FIG. 7, the AR 70 includes: a protocol processing module 701 and a processor 702.

The protocol processing module 701 is configured to receive a first packet sent in a unicast manner by a CGN, where the first packet includes information for indicating Restart announce, a source address of the first packet is an address of the CGN, and a destination address of the first packet is an address of the AR.

Optionally, when an exception occurs, for example, the CGN restarts or undergoes an active/standby switchover, the source address of the first packet generated by the CGN is an IP address of the CGN, and the destination address of the first packet is an IP address of the AR. Further, the first packet may further include: a port number of a port through which the AR receives the first packet.

The processor 702 is configured to change, according to the first packet received by the protocol processing module 701, the destination address of the first packet to an address of a CPE connected to the AR, to obtain a second packet, where the AR and the CPE are connected by using a Layer 2 network, and the address of the CPE is a multicast address.

The AR may determine the address of the CPE according to a network to which the CPE belongs, that is, the AR may determine the multicast address.

Specifically, if the CPE belongs to an IPv4 network, the multicast address is 224.0.0.1; if the CPE belongs to an IPv6 network, the multicast address is ff02::1.

Exemplarily, a process of generating the second packet according to the first packet may be that: if the AR receives a UDP packet sent by the CGN, and the packet includes the information for indicating Restart announce, the AR changes, according to a network (an IPv4 network or an IPv6 network) to which the CPE belongs, a destination address in a packet header of the UDP packet to a multicast address corresponding to the network to which the CPE belongs. That is, if the CPE belongs to an IPv4 network, the multicast address is 224.0.0.1; if the CPE belongs to an IPv6 network, the multicast address is ff02::1.

In addition, when the port number of the port through which the AR receives the first packet, which is included in the first packet, and a port number for indicating a port through which the CPE receives the second packet are different, the processor 702 changes the port number of the port through which the AR receives the first packet to the port number for indicating the port through which the CPE receives the second packet; if the port number of the port through which the AR receives the first packet and the port number for indicating the port through which the CPE receives the second packet are the same, the processor 702 does not need to change the port number of the port through which the AR receives the first packet.

The processor 702 is specifically configured to: according to the first packet received by the protocol processing module 701, change the source address of the first packet to the address of the AR, and change the destination address of the first packet to the address of the CPE, to obtain the second packet.

Further, the processor 702 is configured to add a CGN address option to the second packet to carry the address of the CGN.

The option may be a THIRD_PARTY for announce option.

The THIRD_PARTY for announce option includes: an option code, a reserved field, a length of the address of the CGN, and the address of the CGN, where the option code indicates a type of the information for indicating Restart announce. Refer to the method embodiment for a format of the option encapsulated into the second packet, and details are not described herein again.

The protocol processing module 701 is further configured to send the second packet generated by the processor 702.

Exemplarily, the protocol processing module 701 is configured to send the second packet generated by the processor 702 to the CPE according to a multicast address in a packet header of the second packet.

Further, optionally, after receiving the second packet, the CPE sends NAT mapping information saved by the CPE to the CGN according to the IP address of the CGN in the packet header of the second packet, to request the CGN to create the NAT mapping information.

Optionally, after receiving the second packet, the CPE sends NAT mapping information saved by the CPE to the CGN according to the IP address of the CGN in the THIRD_PARTY for announce option of the second packet, to request the CGN to create the NAT mapping information.

This embodiment of the present application provides an AR. A CGN sends, to an AR in a unicast manner, a first packet including information for indicating Restart announce. Because there are a limited number of ARs and the ARs are static, the CGN has relatively small load when sending the first packet to the AR. The AR can quickly send, to a CPE in a multicast manner, a second packet including the information for indicating Restart announce. In addition, it is only required in the method that a Layer 2 network is between the AR and the CPE. Therefore, the method is applicable to a commonest application scenario.

When the PCP protocol is used for the foregoing AR, the CGN may be a PCP server, and the CPE may be a PCP client.

An embodiment of the present application provides a system for quickly informing a CGN exception, including: a CGN, a CPE, and the AR provided in the foregoing embodiments, where a structure of the AR has been described in the foregoing embodiments and is not described herein again.

This embodiment of the present application provides a system for quickly informing a CGN exception. A CGN sends, to an AR in a unicast manner, a first packet including information for indicating Restart announce. Because there are a limited number of ARs and the ARs are static, the CGN has relatively small load when sending the first packet to the AR. The AR can quickly send, to a CPE in a multicast manner, a second packet including the information for indicating Restart announce. In addition, it is only required in the method that a Layer 2 network is between the AR and the CPE. Therefore, the method is applicable to a commonest application scenario.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method applied in a network comprising a carrier grade network address translation (CGN) device, a plurality of access devices and a plurality of customer premise equipment (CPEs), each CPE communicates with the CGN device through one of the plurality of access devices, wherein when a CGN exception occurs on the CGN device, the method comprises:
   receiving, by a first access device, information indicating a Restart announce sent in a unicast manner by the CGN device, where the first access device is one of the plurality of access devices, and a first CPE communicates with the CGN device through the first access device, where the first CPE is one of the plurality of CPEs;
   multicasting, by the first access device, the received information indicating the Restart announce to CPEs among the plurality of CPEs that are connected to the first access device, wherein the first CPE is one of the CPEs connected to the first access device, and wherein the first access device and the CPEs connected to the first access device are connected in a Layer 2 of the network.

2. The method according to claim 1, wherein the first access device receives the information through a port of the access device.

3. The method according to claim 1, wherein the received information for indicating the Restart announce is carried in a User Datagram Protocol (UDP) packet.

4. The method according to claim 1, wherein the received information for indicating the Restart announce is carried in a multicast packet to multicast to the CPEs connected to the first access device.

5. The method according to claim 1, where the first access device comprises one of: an access router and a Broadband Remote Access Server (BRAS).

6. The method according to claim 1, where the first access device is a router closest to the first CPE.

7. The method according to claim 4, where the received information for indicating the Restart announce is carried in a THIRD_PARTY for announce option in the multicast packet.

8. A first access device among a plurality of access devices in a network, where the network includes a carrier grade network address translation (CGN) device, a plurality of access devices and a plurality of customer premise equipment (CPEs), each CPE communicating with the CGN device through one of the plurality of access devices, the first access device is one of the plurality of the access devices, and a first CPE in the plurality of the CPEs communicates with the CGN device through the first access device, wherein the first access device comprises:
   a processor and a non-transitory processor readable storage medium including executable instructions which, when executed by the processor, cause the processor to perform the following operations when a CGN exception occurs on the CGN device:
   receiving information indicating a Restart announce sent in a unicast manner by the CGN device;
   a) generating, according to the received information, a multicast packet for CPEs among the plurality of the CPEs that are connected to the first access device, where the first access device and the CPEs connected to the first access device are connected in a Layer 2 of the network; and
   b) send the generated multicast packet to the CPEs connected to the first access device.

9. The first access device according to claim 8, wherein the received information for indicating the Restart announce is carried in a User Datagram Protocol (UDP) packet.

10. The first access device according to claim 8, wherein the multicast packet comprises a THIRD_PARTY for an announce option.

11. The first access device according to claim 8, where the first access device comprises one of: an access router and a Broadband Remote Access Server (BRAS).

12. The first access device according to claim 8, where the first access device is a router closest to the first CPE.

13. A non-transitory computer readable medium in communication with a first access device among a plurality of access devices in a network, where the network comprises a carrier grade network address translation (CGN) device, a plurality of access devices and a plurality of customer premise equipment (CPEs) each CPE communicates with the CGN device through one of the plurality of access devices the first access device is one of the plurality of the access devices, a first CPE in the plurality of the CPEs communicates with the CGN device through the first access device, wherein the non-transitory computer readable medium comprises processor-executable instructions, which when executed by a processor cause the processor to perform the following operations when a CGN exception occurs on the CGN device:
   receiving, information indicating a Restart announce sent in a unicast manner by the CGN device;
   multicasting, the received information for indicating the Restart announce to CPEs among the plurality of the CPEs that are connected to the first access device, wherein the first access device and the CPEs connected to the first access device are connected in a Layer 2 of the network.

14. The non-transitory computer readable medium according to claim 13, wherein the information is received through a port of the first access device.

15. The non-transitory computer readable medium according to claim 13, wherein the received information for indicating the Restart announce is carried in a User Datagram Protocol (UDP) packet.

16. The non-transitory computer readable medium according to claim 13, wherein the received information for indicating the Restart announce is carried in a multicast packet to multicast to the CPEs connected to the first access device.

17. The non-transitory computer readable medium according to claim 13, where the first access device comprises one of: an access router and a Broadband Remote Access Server (BRAS).

18. The non-transitory computer readable medium according to claim 13, where the first access device is a router closest to the first CPE.

19. The non-transitory computer readable medium according to claim 16, where the received information for indicating the Restart announce is carried in a THIRD_PARTY for announce option in the multicast packet.

* * * * *